(12) United States Patent
Spertus et al.

(10) Patent No.: US 7,831,560 B1
(45) Date of Patent: Nov. 9, 2010

(54) SNAPSHOT-AWARE SECURE DELETE

(75) Inventors: Michael Paul Spertus, Chicago, IL (US); Timothy Michael Naftel, Longmont, CO (US)

(73) Assignee: Symantec Corporation, Mountain View, CA (US)

( * ) Notice: Subject to any disclaimer, the term of this patent is extended or adjusted under 35 U.S.C. 154(b) by 982 days.

(21) Appl. No.: 11/615,692

(22) Filed: Dec. 22, 2006

(51) Int. Cl.
*G06F 17/30* (2006.01)
(52) U.S. Cl. .................................... 707/639
(58) Field of Classification Search .......... None
See application file for complete search history.

(56) References Cited

U.S. PATENT DOCUMENTS

| | | | |
|---|---|---|---|
| 2003/0079078 A1* | 4/2003 | Zipprich et al. | 711/112 |
| 2003/0130986 A1* | 7/2003 | Tamer et al. | 707/1 |
| 2003/0167380 A1* | 9/2003 | Green et al. | 711/136 |
| 2004/0107222 A1* | 6/2004 | Venkatesh et al. | 707/200 |
| 2005/0065986 A1* | 3/2005 | Bixby et al. | 707/204 |
| 2007/0101054 A1* | 5/2007 | Sivathanu et al. | 711/112 |
| 2008/0059541 A1* | 3/2008 | Fachan et al. | 707/204 |

OTHER PUBLICATIONS

Secure Deletion for a Versioning File System by Peterson et al. Dec. 2005 FAST'05: Proceedings of the 4th conference on USENIX Conference on File and Storage Technologies—vol. 4.*
Fisher, K., "*Recycle Bin not enough, Microsoft adds "Previous Versions" support on the file system level*" pp. 1-3 [online]. Retrieved from the Internet: <URL: http: //arstechnica.com/news.ars/post/20060730—7383.html>.
"*Microsoft Adds Risky System-Wide Undelete to Vista*", p. 1 [online posting]. Retrieved from the Internet : <URL: http: //yro.slashdot.org/article.pl?sid=06/07/31/0044201>, 2006.
"*Windows 2003 Volume Shadow Copy Service(VSS)*", pp. 1-5, slides 3-27 of presentation [online]. Retrieved from the Internet : <URL:http://download.microsoft.com/download/7/3/b/73bc1305-2a72-4947-8f02-65e6e1abe100/TechnologyDrillDown.ppt>, 2003.
"*Windows Server 2003 Introduction to Shadow Copies of Shared Folders*", pp. 1-15 [online]. Retrieved from the Internet:<URL:http://download.microsoft.com/windowsserver2003/techinfo/overview/scr.mspx>, 2003.

* cited by examiner

*Primary Examiner*—Neveen Abel Jalil
*Assistant Examiner*—Kevin Young
(74) *Attorney, Agent, or Firm*—Gunnison, McKay & Hodgson, L.L.P.; Forrest Gunnison

(57) ABSTRACT

A snapshot-aware secure delete event identifying a file for snapshot-aware secure deletion on a computer system is received, and the file to be deleted is identified from the snapshot-aware secure delete event. Each file snapshot associated with the file on the computer system is accessed at the volume level and each non-duplicate file extent of the file snapshots is identified. The raw data identified by each non-duplicate file extent is securely overwritten using a secure overwrite technique, and each file snapshot is deleted from the computer system. In this way the raw data of the file and the raw data of all the diff areas of file snapshots associated with the file are securely overwritten and deleted.

12 Claims, 9 Drawing Sheets

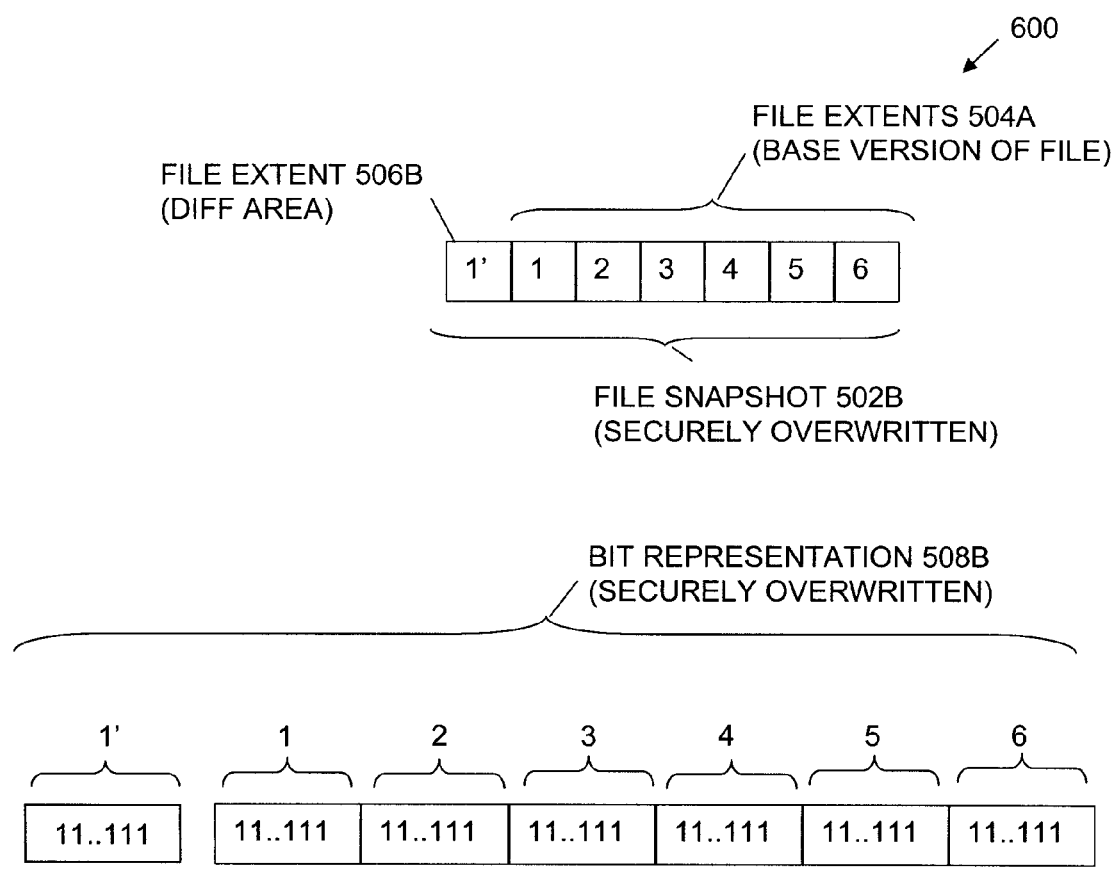

SNAPSHOT-AWARE SECURE DELETE

BACKGROUND OF THE INVENTION

1. Field of the Invention

The present invention relates to computer systems. More particularly, the present invention relates to the deletion of files on a computer system.

2. Description of Related Art

Typically when a snapshot is taken of a file system, for example, by a system restore point snapshot function, a point in time copy of the file system is stored on the computer system as a snapshot file, i.e., a digital snapshot file. Rather than making complete copies of each of the files each time a snapshot is taken, some snapshot systems store changes made to a base version of a file in a diff area generated in the file system.

In these systems, a snapshot of a file references the base version of the file stored in the file system and any changes made to the file that are stored in the diff area of the file system. Consequently, the diff area grows with changes to the file system, and is referenced to the base versions of the files in the file system, so that the combination provides a version of the files in the file system at the particular point in time the snapshot was taken.

Currently, when a file is deleted, such as through a conventional file deletion, the file system record associated with the file is marked as deleted, and the base version of the file is moved into the diff area. Thus, a digital snapshot of the deleted file referencing the raw data of the base version of the file remains on the computer system. Additionally, any earlier snapshots of the file also remain on the computer system.

SUMMARY OF THE INVENTION

In accordance with one embodiment of the invention, a method for snapshot-aware secure deletion of a file includes: accessing all file snapshots associated a file on a computer system, wherein each file snapshot associated with the file in all file snapshots includes one or more file extents identifying raw data associated with the file snapshot; identifying each non-duplicate file extent in all the file snapshots associated with the file; securely overwriting the raw data identified by each non-duplicate file extent; and, deleting all file snapshots associated with the file on the computer system. In this way, the raw data of the base version of the file and the raw data of any diff areas associated with the file snapshots of the file are securely overwritten, and deleted on the computer system thus reducing the potential for recovery and compromise of the data of the deleted file.

Embodiments described herein are best understood by reference to the following detailed description when read in conjunction with the accompanying drawings.

BRIEF DESCRIPTION OF THE DRAWINGS

FIG. 6 is a diagram illustrating a subsequent state of the file snapshot of FIG. 5 following secure overwrite of the data of each non-duplicate file extent in accordance with one embodiment of the invention.

Common reference numerals are used throughout the drawings and detailed description to indicate like elements.

DETAILED DESCRIPTION

Figure 1:
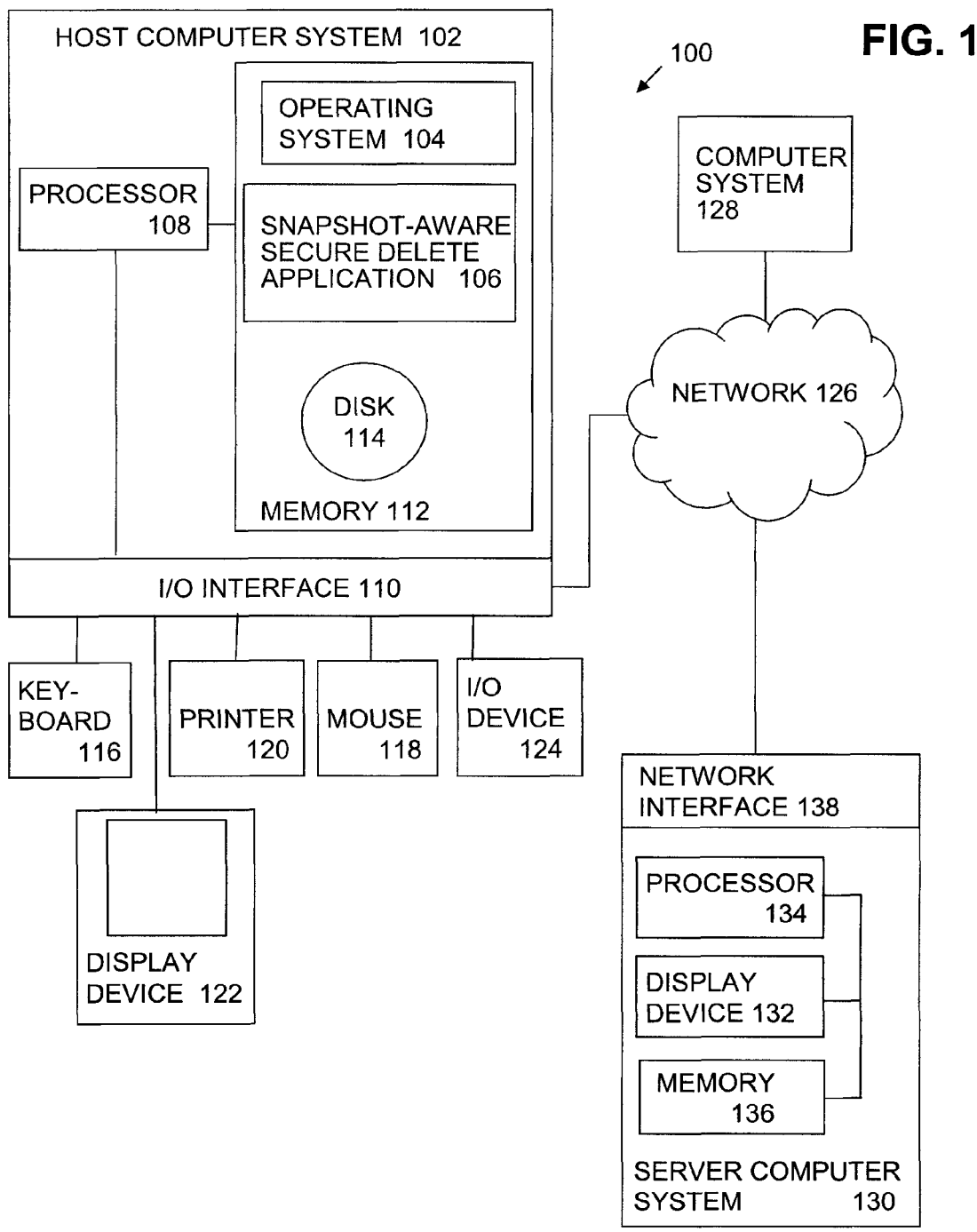
FIG. 1 is a diagram of a computer system that includes a snapshot-aware secure delete application executing on a host computer system in accordance with one embodiment of the invention.

Generally viewed, a file system snapshot freezes in time a consistent image of the file system. Snapshot technologies are implemented several ways. One conventional snapshot method is termed a copy-on-write (COW) method. Typically, when a snapshot is initiated, a diff area is created in a volume of the file system on the disk.

When a file is modified, the original version of the file, also termed the base version of the file, is read, but the changes do not overwrite the base version of the file. Instead, the changes are written to the diff area created on the disk for that file system snapshot.

Thus, when the modified file is read it is read as the base version of the file and any changes to the base version of the file stored in the diff area. Each time a new snapshot is generated, a new diff area is created. In this way the diff area only grows as the file system changes.

When a file is conventionally deleted, the data clusters containing changes to the file are deleted from the diff area of the most recent snapshot, and the file system record associated with the file, such as the MFT record in Windows XP, is modified to indicate the file as deleted. The MFT record is moved into the diff area, and the file is moved to the recycle bin.

From a user's perspective, the file is deleted, but if a snapshot of the file is mounted, the file still exists in the snapshot. More particularly, the file extents of the file snapshot indicate the location of the raw data of the file in the file system, i.e., as stored on disk. Thus, in a conventional non-secure file delete, just the current view of the file is deleted, not the file snapshots of the file.

Snapshots not only affect files that have been modified, but can also affect those files that have not been modified. For example, on a new system with no previous snapshots, a system restore point can be created with a snapshot and diff area being generated.

If an unmodified file is then selected for conventional file deletion, the file system will modify the MFT record to indicate the file as deleted, and copy the MFT record into the diff area. Thus, even where a file has not been modified, but a snapshot had been created, e.g., for the system restore point, the raw data of the deleted file is referenced in the file snapshot, i.e., in the file extents of the file snapshot.

Snapshots also affect the integrity of some data deletion techniques. For example, some data deletion techniques attempt to substantially guarantee that data of a deleted file cannot be recovered from a computer system by overwriting the file multiple times, and often with differing overwrite data patterns.

In computer system utilizing snapshots, these data deletion techniques are rendered ineffective because, while it appears the data is being overwritten, each of the changes are being written to the diff area and are not overwriting the raw data of the base version of the file. The deleted file still exists in any file system snapshots of the file and prevents thorough deletion of the data. Thus, as described above, the inability to completely delete files from computer systems utilizing file system snapshots, such as Windows XP with "System Protection" enabled, presents a serious security hole.

Figure 2:
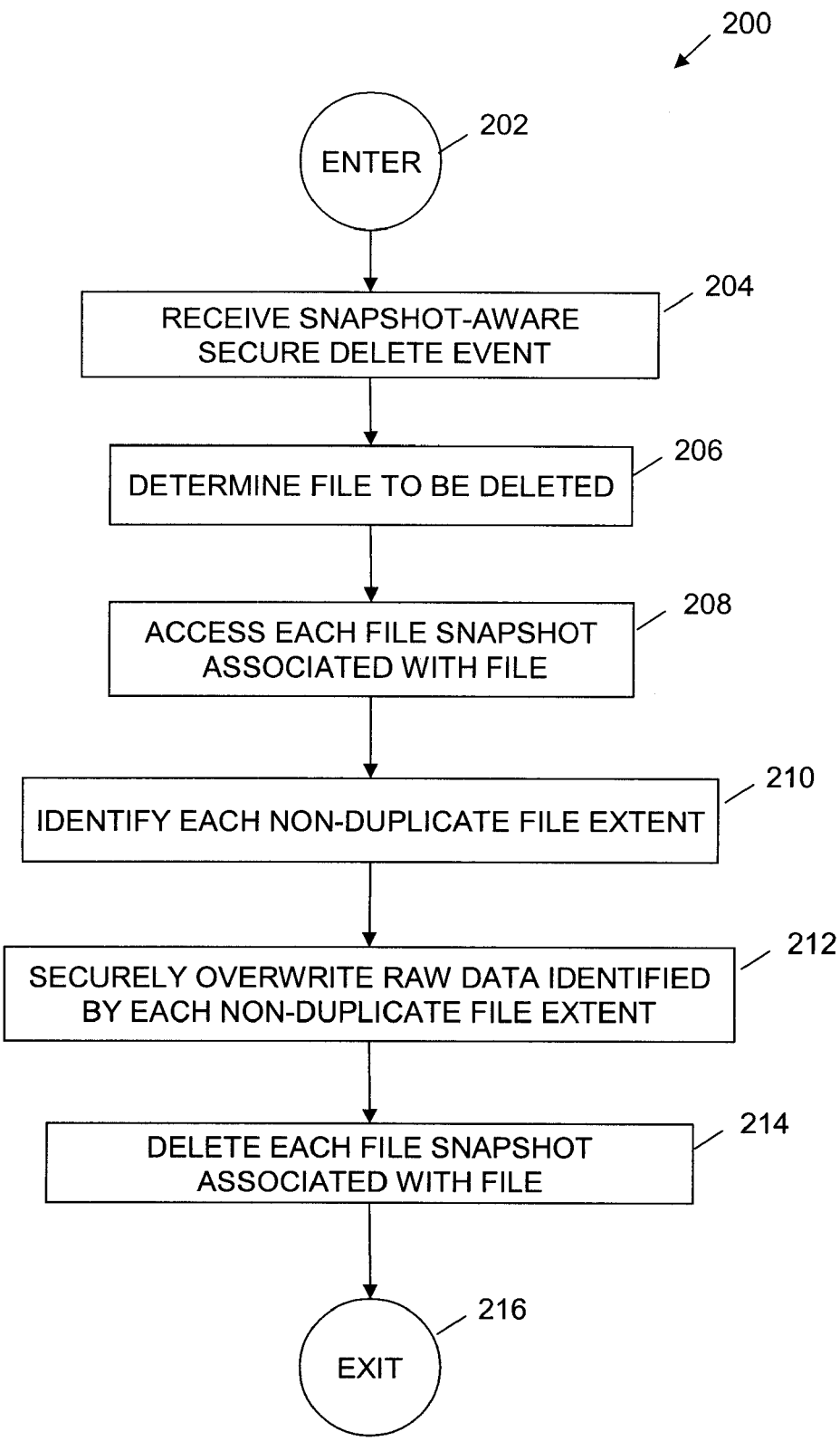
FIG. 2 illustrates a flow diagram of a method for snapshot-aware secure deletion of a file on a computer system in accordance with one embodiment of the invention.

Referring generally to FIG. 2, in one embodiment, a snapshot-aware secure delete event is received (operation 204) and a file to be deleted from a computer system is determined from the snapshot-aware secure delete event (operation 206). All file snapshots associated with the file are accessed (operation 208), and each non-duplicate file extent of all the file snapshots is identified (operation 210). The raw data identified by each non-duplicate file extent is securely overwritten on disk using a secure overwrite technique (operation 212), and all the file snapshots associated with the file are deleted from the computer system (operation 214). Embodiments in accordance with the invention reduce the potential for recovery and compromise of the raw data associated with a deleted file.

Referring now, more particularly, to FIG. 1, FIG. 1 is a diagram of a computer system 100 that includes a snapshot-aware secure delete application 106 executing on a host computer system 102 in accordance with one embodiment of the invention. Host computer system 102, a first computer system, sometimes called a client or user device, typically includes a central processing unit (CPU) 108, hereinafter processor 108, an input/output (I/O) interface 110, a memory 112; and a disk 114, e.g., a physical hard disk, which may be internal or external to computer system 102. In one embodiment, memory 112 includes an operating system 104, such as a page-based virtual memory system that uses pages, e.g., memory areas.

For example, Windows XP (available from Microsoft Corporation, Redmond, Wash.) is an operating system widely used on home and business computer systems. Windows XP provides a page-based virtual memory management scheme that permits programs to realize a virtual memory address space. In one embodiment, when processor 108 is running in virtual memory mode, all addresses are presumed virtual addresses and are translated, or mapped, to physical addresses each time processor 108 executes a new instruction to access memory.

Windows XP typically stores data on the physical disk(s) of a computer system, e.g., disk 114, in accordance with the New Technology File System (NTFS). The data as stored on the physical disk is commonly termed raw data. The basic unit of allocation in the NTFS is a data cluster, also sometimes termed a block, of a specified number of bytes that is also a multiple of a sector size of the physical disk. For example, a NTFS cluster of 4 kilobytes includes eight (8) 512 byte sectors on a physical disk. NTFS addresses data using a cluster number.

The NTFS formats the disk space on a physical disk into volumes. Data is stored in a volume as files. Each NTFS volume has a special file called the Master File Table (MFT) that includes at least one record for each file in the volume. Similar to file records, directory records are also stored in the MFT, however, rather than data, directory records contain index information.

The first sixteen (16) records in an MFT are reserved for special files used by the NTFS. In particular, record 5, also commonly termed index 5, of a MFT is the root directory folder and includes index information for locating a next directory level on the volume in the directory structure. Thus, beginning with record 5, a full path name to a selected file can be indexed through the directory records to determine the location of the record of the selected file on the MFT.

Following the first sixteen (16) reserved records in the MFT, the remaining records on the MFT are for each file and directory on the volume. Generally, a MFT record includes a set of file attributes that represent the file. Elements such as a file's name, the file's security information, and the file's data are file attributes.

Attributes stored in the MFT record are commonly termed resident attributes, and attributes stored outside the MFT record are termed nonresident attributes. When file attributes are too large for the MFT record, the attributes are stored in clusters of disk space, i.e., data clusters, outside the MFT structure but within the volume.

The MFT record includes an attribute list, which itself is an attribute, which lists the location of all attributes that reside in other MFT records. When a file is small, an MFT record can include the raw data of the file. In larger files, an MFT record lists the location(s) where all the raw data in the file can be found on the volume, herein termed file extents.

Thus, herein in one embodiment, a file extent identifies the location on the disk where at least a portion of the raw data associated with a file is located. Windows XP, the NTFS, the MFT, the MFT record and directory structures, file extents, and raw data are well known to those of skill in the art and are not further described herein in detail to avoid detracting from the principles of the invention.

In the present embodiment, it is assumed that operating system 104 includes and/or has access to a digital snapshot service that provides a digital snapshot of disk 114 and/or of file system volumes on disk 114. For example, Windows XP provides a digital snapshot service termed "System Protection". Generally the "System Protection" service provides periodic snapshots of the file system in order to create a "system restore point".

Thus, multiple digital snapshots of a file, herein termed file snapshots, can exist on computer system 102. In Windows XP, when "System Protection" is enabled, a user can utilize a "Previous Version" functionality on a deleted file to restore the deleted file using a digital snapshot of the file.

Although digital snapshot services can implement the storage of digital snapshots in a variety of ways, for purposes of description it is assumed that the digital snapshot service provides at least a volume snapshot which includes one or more individual file snapshots of files on the volume. Further, it is assumed for purposes of description that each file snapshot includes one or more file extents that identify the location(s) of raw data, e.g., data clusters, that represent a base version of an associated file, as well as one or more file extents that identify the location(s) of raw data, e.g., data clusters, that represent changes made to the base version of the file stored in a diff area(s), if any. Where differentiation is used for clarity of description, file extents that identify the location(s) of raw data that represent a base version of an associated file are termed herein base version file extents, and file extents that identify the locations(s) of raw data in a diff area that represent the changes made to the base version of the associated file are termed herein diff area file extent(s).

Host computer system 102 may further include standard devices like a keyboard 116, a mouse 118, a printer 120, and a display device 122, as well as, one or more standard input/ output (I/O) devices 124, such as a compact disk (CD) or DVD drive, floppy disk drive, or other digital or waveform port for inputting data to and outputting data from host computer system 102. In one embodiment, snapshot-aware secure delete application 106 is loaded into host computer system 102 via I/O device 124, such as from a CD, DVD or floppy disk containing snapshot-aware secure delete application 106.

In some embodiments, host computer system 102 is coupled to a server computer system 130 of client-server computer system 100 by a network 126. Server computer system 130 typically includes a display device 132, a processor 134, a memory 136, and a network interface 138.

Further, host computer system 102 can also be coupled to other computer systems, such as a computer system 128, by network 126 over which information can be sent and received. In one embodiment, computer system 128 is similar to host computer system 102 and, for example, includes a central processing unit, an input output (I/O) interface, and a memory. Computer system 128 may further include standard devices like a keyboard, a mouse, a printer, a display device and an I/O device(s).

Network 126 can be any network or network system that is of interest to a user. In various embodiments, network interface 138 and I/O interface 110 include analog modems, digital modems, or a network interface card.

In one embodiment, snapshot-aware secure delete application 106 is stored in memory 112 of host computer system 102 and executed on host computer system 102. The particular type and configuration of host computer system 102, computer system 128, and server computer system 130 are not essential to the present embodiment.

Although examples of the present invention are described herein with reference to Windows XP, those of skill in the art can apply the principles and operations described herein to other operating systems, file systems, and digital snapshot services with modifications as needed by a specific operating system and/or file system and/or digital snapshot service.

FIG. 2 illustrates a flow diagram of a method 200 for snapshot-aware secure deletion of a file on a computer system in accordance with one embodiment of the invention. Referring now to FIGS. 1 and 2 together, in one embodiment, execution of snapshot-aware secure delete application 106 by processor 108 results in the operations of method 200 as described below. In one embodiment, method 200 is entered at an ENTER operation 202, and from ENTER operation 202, processing transitions to a RECEIVE SNAPSHOT-AWARE SECURE DELETE EVENT operation 204.

In RECEIVE SNAPSHOT-AWARE SECURE DELETE EVENT operation 204, a snapshot-aware secure delete event is received. Examples of a snapshot-aware secure delete event include, but are not limited to, a command, an application program interface (API), or other event that initiates or otherwise indicates the initiation of a snapshot-aware secure delete. In one embodiment, the snapshot-aware secure delete event identifies a file for snapshot-aware secure deletion in accordance with an embodiment of the present invention. In one embodiment, the file for secure deletion is identified in the snapshot-aware secure delete event as a file name, file path, or file location. From RECEIVE SNAPSHOT-AWARE SECURE DELETE EVENT operation 204, processing transitions to a DETERMINE FILE TO BE DELETED operation 206.

In DETERMINE FILE TO BE DELETED operation 206, a file identified for snapshot-aware secure deletion is determined. In one embodiment, the file to be deleted is determined from the snapshot-aware secure delete event. For example, in one embodiment, the file identified for snapshot-aware secure deletion is identified by a file name, file path, or file location obtained from the snapshot-aware secure delete event. From DETERMINE FILE TO BE DELETED operation 206, processing transitions to an ACCESS EACH FILE SNAPSHOT ASSOCIATED WITH FILE operation 208.

In ACCESS EACH FILE SNAPSHOT ASSOCIATED WITH FILE operation 208, all file snapshots associated with the file determined in operation 206 are accessed. More particularly, each file snapshot of the file determined in operation 206 in the file system, e.g., in the file system utilized by computer system 102 is accessed. From ACCESS EACH FILE SNAPSHOT ASSOCIATED WITH FILE operation 208, processing transitions to an IDENTIFY EACH NON-DUPLICATE FILE EXTENT operation 210.

In IDENTIFY EACH NON-DUPLICATE FILE EXTENT operation 210, each non-duplicate file extent from all the file snapshots accessed in operation 208 is identified. For example, in one embodiment, accessing each of the file snapshots associated with the file in operation 208 allows the identification of all the file extents for each of those file snapshots, which identify of all the data clusters on the disk associated with the file snapshots. The non-duplicate file extents are identified and saved for later reference, for example, saved as individual entries to a non-duplicate file extent list.

Thus, in one embodiment, the non-duplicate file extent list includes file extents indicating the location of the data clusters representing the base version of the file, and file extents indicating the location of the data clusters representing changes to the base version of the file stored in one or more diff areas, if any. From IDENTIFY EACH NON-DUPLICATE FILE EXTENT operation 210, processing transitions to a SECURELY OVERWRITE RAW DATA IDENTIFIED BY EACH NON-DUPLICATE FILE EXTENT operation 212.

In SECURELY OVERWRITE RAW DATA IDENTIFIED BY EACH NON-DUPLICATE FILE EXTENT operation 212, the data identified by each non-duplicate file extent, identified in operation 210, is securely overwritten. In one embodiment, the raw data in each non-duplicate file extent is securely overwritten at the volume level. More particularly, in one embodiment, the associated volume is opened and the raw data identified by each non-duplicate file extent is directly overwritten on the disk using a secure overwrite technique.

A variety of secure overwrite techniques can be used to overwrite the data. For example, the data can be securely overwritten in accordance with a government approved secure overwrite technique, or can be securely overwritten with a different secure overwrite technique. The secure overwrite technique can overwrite the data in each of the non-duplicate file extents one or more times, and can use one or more patterns depending on the secure overwrite technique utilized. A variety of secure overwrite techniques are well known to those of skill in the art and are not further described herein in detail to avoiding detracting from the principles of the invention. From SECURELY OVERWRITE RAW DATA IDENTIFIED BY EACH NON-DUPLICATE FILE EXTENT operation 212, processing transitions to a DELETE EACH FILE SNAPSHOT ASSOCIATED WITH FILE operation 214.

In DELETE EACH FILE SNAPSHOT ASSOCIATED WITH FILE operation 214, each file snapshot associated with the file identified in operation 206, e.g., each file snapshot accessed in operation 208, is deleted. More particularly, in one embodiment, each file snapshot associated with the file is conventionally deleted.

Assuming again a conventional delete file action in a copy-on-write system, the MFT record will be tagged as deleted, and MFT record of the file will be copied into the diff area. However, as all the raw data referenced by the non-duplicate file extents was securely overwritten in operation 212, what is copied into the diff area merely references the securely overwritten raw data. From DELETE EACH FILE SNAPSHOT ASSOCIATED WITH FILE operation 214, processing transitions to an EXIT operation 216 with processing exiting method 200, or optionally returns to operation 204 on receipt of a next snapshot-aware secure delete event. A specific embodiment of method 200 is further described herein with reference to FIG. 3 and a method 300.

Figure 3A:
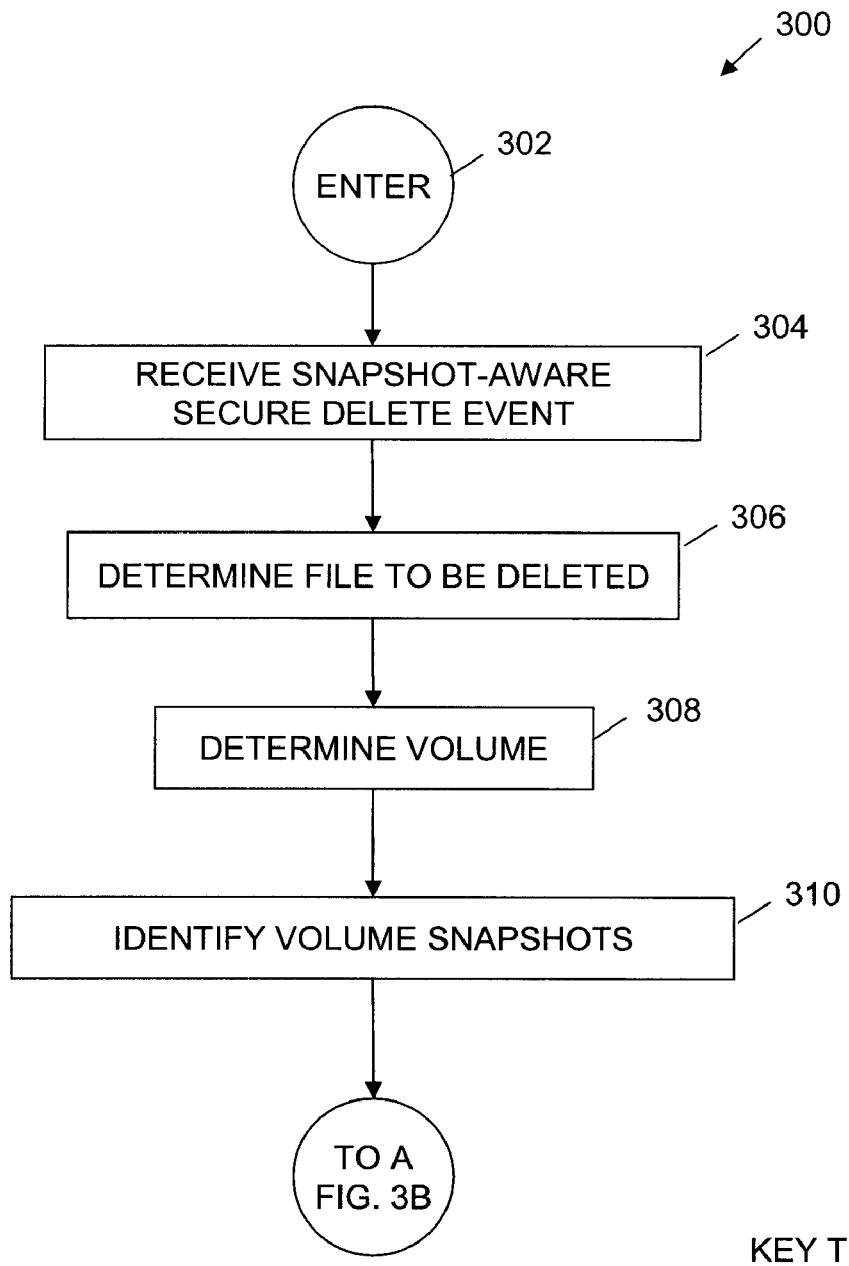
FIG. 3 is a key to FIGS. 3A, 3B, 3C, and 3D which illustrate a flow diagram of a method for snapshot-aware secure deletion of a file on a computer system in accordance with another embodiment of the invention.

FIG. 3 is a key to FIGS. 3A, 3B, 3C, and 3D which illustrate a flow diagram of a method 300 for snapshot-aware secure deletion of a file on a computer system in accordance with another embodiment of the invention. Referring now to FIGS. 1 and 3A together, in one embodiment, execution of snapshot-aware secure delete application 106 by processor 108 results in the operations of method 300 as described below. In one embodiment, method 300 is entered at an ENTER operation 302, and from ENTER operation 302, processing transitions to a RECEIVE SNAPSHOT-AWARE SECURE DELETE EVENT operation 304.

In RECEIVE SNAPSHOT-AWARE SECURE DELETE EVENT operation 304, a snapshot-aware secure delete event is received. In one embodiment, the snapshot-aware secure delete event identifies a file for snapshot-aware secure deletion in accordance with an embodiment of the present invention. In one embodiment, the file identified for snapshot-aware secure deletion is identified by a file name, file path, or file location in the snapshot-aware secure delete event. In other embodiments, the file identified for snapshot-aware secure deletion can be differently identified. From RECEIVE SNAPSHOT-AWARE SECURE DELETE EVENT operation 304, processing transitions to a DETERMINE FILE TO BE DELETED operation 306.

In DETERMINE FILE TO BE DELETED operation 306, a file identified for snapshot-aware secure deletion is determined. In one embodiment, the file identified for snapshot-aware secure deletion is determined from the snapshot-aware secure delete event. For example, in one embodiment, the file identified for snapshot-aware secure deletion is identified by a file name, file path, or file location identified in the snapshot-aware secure delete event. From DETERMINE FILE TO BE DELETION operation 306, processing transitions to DETERMINE VOLUME operation 308.

In DETERMINE VOLUME operation 308, the file system volume containing the raw data of the file identified for snapshot-aware secure deletion is determined. In one embodiment, the volume is determined from the file path, file name, or other identifier of the file identified for snapshot-aware secure deletion. For example, if the file path of the file identified for snapshot-aware secure deletion determined in operation 306 is C:\deleteme.doc, the operating system, e.g., operating system 104, is queried for the volume identifier (ID) of the volume associated with the file, e.g., "C". The operating system determines the volume ID and returns the volume ID to snapshot-aware secure delete application 106.

Determining a volume ID for a volume in a file system, e.g., a volume ID in the NTFS, is well known to those of skill in the art and is not further described herein to avoid detracting from the principles of the invention. From DETERMINE VOLUME operation 308, processing transitions to an IDENTIFY VOLUME SNAPSHOTS operation 310.

In IDENTIFY VOLUME SNAPSHOTS operation 310, the location(s) of each digital snapshot associated with the volume identified in operation 308 is identified. For example, in one embodiment, the operating system is queried for identifiers of all volume snapshots of the volume identified in operation 308.

The operating system determines the volume snapshots of the specified volume and returns a listing of each volume snapshot, for example, a listing identifying all associated volume snapshots using a file path, file name, or other identifier for each volume snapshot. Herein this listing is termed a volume snapshot listing. From IDENTIFY VOLUME SNAPSHOTS operation 310, processing transitions to an ACCESS VOLUME SNAPSHOT operation 312.

Figure 3B:
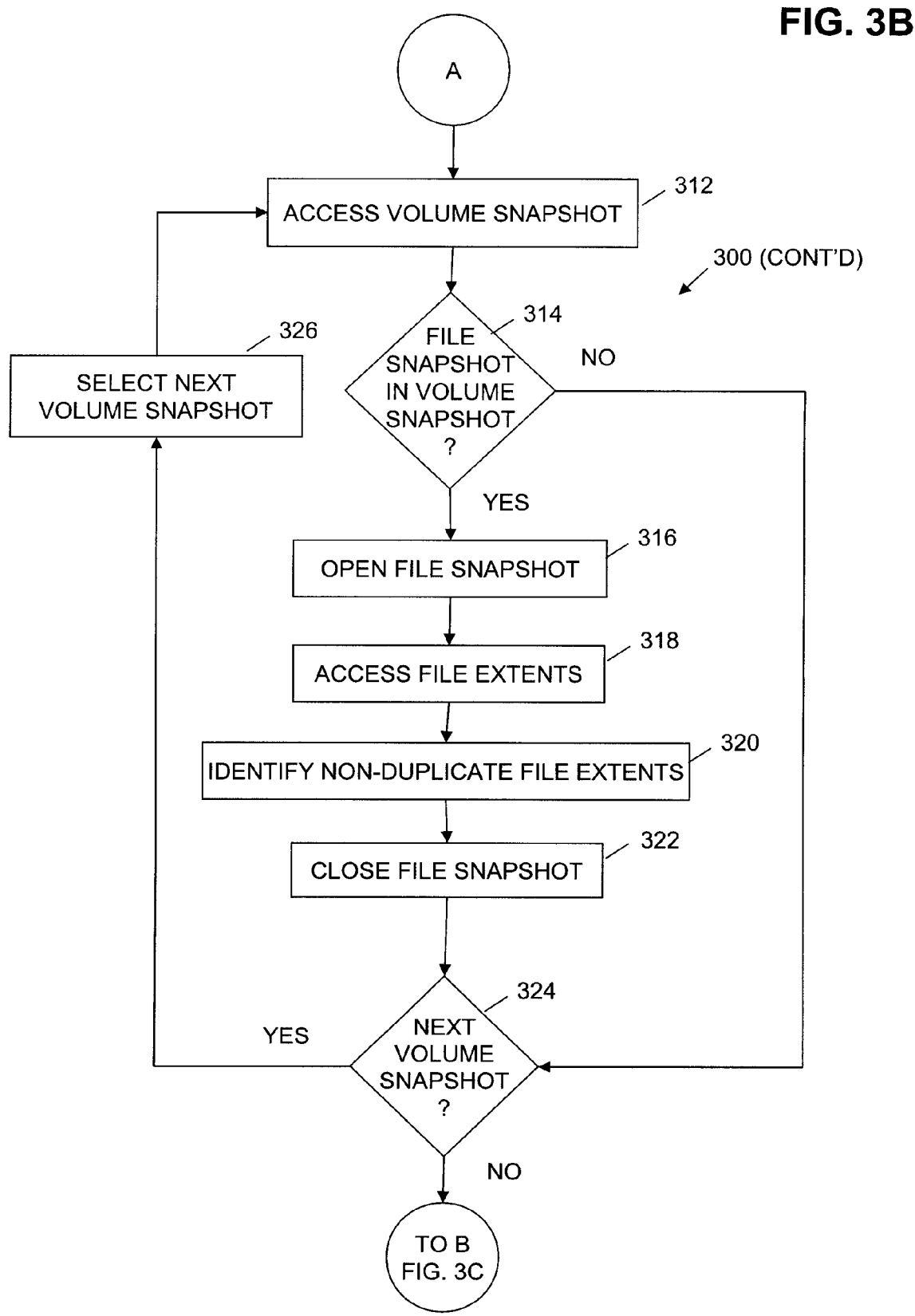

Referring now to FIGS. 1 and 3B together, in one embodiment, in operations 312 through 326, each volume snapshot identified in operation 310 is iteratively accessed to determine whether a snapshot of the file identified for snapshot-aware secure deletion, i.e., herein termed a file snapshot, is present in the volume snapshot. If a file snapshot of the file identified for snapshot-aware secure deletion is present, non-duplicate file extents of the file snapshot are identified and saved for later reference.

More particularly, in ACCESS VOLUME SNAPSHOT operation 312, a volume snapshot identified in operation 310 is accessed. For example, in one embodiment, initially, a first volume snapshot identified in the volume snapshot listing obtained in operation 310 is accessed. From ACCESS VOLUME SNAPSHOT operation 312, processing transitions to a FILE SNAPSHOT IN VOLUME SNAPSHOT check operation 314.

In FILE SNAPSHOT IN VOLUME SNAPSHOT check operation 314, a determination is made whether a file snapshot of the file identified for snapshot-aware secure deletion is present in the volume snapshot accessed in operation 312. For example, in one embodiment, the volume snapshot is examined for the presence of the file path, file name, or other identifier associated with the file identified for snapshot-aware secure deletion.

In one embodiment, when a file snapshot of the file identified for snapshot-aware secure deletion is not present in the volume snapshot ("NO"), from FILE SNAPSHOT IN VOLUME SNAPSHOT check operation 314, processing transitions to a NEXT VOLUME SNAPSHOT check operation 324, further described herein. Alternatively, in one embodiment, when a file snapshot of the file identified for snapshot-aware secure deletion is present in the volume snapshot ("YES"), processing transitions from FILE SNAPSHOT IN VOLUME SNAPSHOT check operation 314, to an OPEN FILE SNAPSHOT operation 316.

In OPEN FILE SNAPSHOT operation 316, the file snapshot located in operation 314, is opened. For example, in one embodiment, the file snapshot is opened using OpenFile( ) and identifying the file snapshot. Opening of a file in a volume is well known to those of skill in the art and is not further described herein to avoid detracting from the principles of the invention. From OPEN FILE SNAPSHOT operation 316, processing transitions to an ACCESS FILE EXTENTS operation 318.

In ACCESS FILE EXTENTS operation 318, the file extents of the file snapshot opened in operation 316 are accessed. Access of file extents from an opened file is well known to those of skill in the art and is not further described herein to avoid detracting from the principles of the invention. From ACCESS FILE EXTENTS operation 318, processing transitions to a IDENTIFY NON-DUPLICATE FILE EXTENTS operation 320.

In IDENTIFY NON-DUPLICATE FILE EXTENTS operation 320, non-duplicate file extents of the file extents accessed in operation 318 are identified. For example, in one embodiment, the file extents of the file snapshot are determined and compared to non-duplicate file extents earlier identified, if any. File extents that do not match any earlier identified non-duplicate file extents are determined to be non-duplicate file extents. In one embodiment, non-duplicate file extents are identified and saved as entries to a non-duplicate file extent list.

Thus, for example, in one embodiment, when a first file snapshot is accessed, each file extent is identified and saved to a non-duplicate file extent list as there are no previous entries to the non-duplicate file extent list. The saved non-duplicate file extents thus identify data clusters associated with the base version of the file, and data clusters associated with changes to the file in the diff area, if any.

Access of subsequent file snapshots contain file extents that again identify data clusters associated with the base version of the file and data clusters associated with changes to the file in the diff area, if any. The file extents associated with the base version of the file are redundant to those earlier saved to the non-duplicate file extent list and thus are not saved again as entries to the non-duplicate file extent list. File extents identifying different diff area data clusters, if any, are presumably non-duplicate and thus are saved to the non-duplicate file extent list.

In this way, the non-duplicate file extent list once identifies each file extent representing the base version of the file and each different file extent representing changes to the base version of the file stored in one or more diff areas. This prevents duplicative overwrites of the raw data later in operation 332, further described later herein. From IDENTIFY NON-DUPLICATE FILE EXTENTS operation 320, processing transitions to a CLOSE FILE SNAPSHOT operation 322.

In CLOSE FILE SNAPSHOT operation 322, the file snapshot opened in operation 316 is closed. For example, in one embodiment, the file snapshot is closed using CloseFile( ) and identifying the file snapshot to be closed. Closure of a file in a volume is well known to those of skill in the art and is not further described herein to avoid detracting from the principles of the invention. From CLOSE FILE SNAPSHOT operation 322, processing transitions to a NEXT VOLUME SNAPSHOT check operation 324.

In NEXT VOLUME SNAPSHOT check operation 324, a determination is made whether a next volume snapshot is present for evaluation. More particularly, in one embodiment, a determination is made whether a next volume snapshot in the volume snapshot list is present for evaluation, i.e., has not been evaluated as earlier described. In one embodiment, when a next volume snapshot is present for evaluation ("YES"), processing transitions from NEXT VOLUME SNAPSHOT check operation 324 to a SELECT NEXT VOLUME SNAPSHOT operation 326.

In SELECT NEXT VOLUME SNAPSHOT operation 326, a next volume snapshot is selected for evaluation. For example, in one embodiment, the next volume snapshot in the volume snapshot list is selected. From SELECT NEXT VOLUME SNAPSHOT operation 326, processing transitions to operation 312 with the next volume snapshot selected in operation 326 being accessed.

Referring again to NEXT VOLUME SNAPSHOT check operation 324, alternatively, when a next volume snapshot is not present for evaluation ("NO"), each volume snapshot identified in operation 310 has been evaluated and processing transitions from NEXT VOLUME SNAPSHOT check operation 324 to an OBTAIN VOLUME HANDLE operation 328.

Figure 3C:
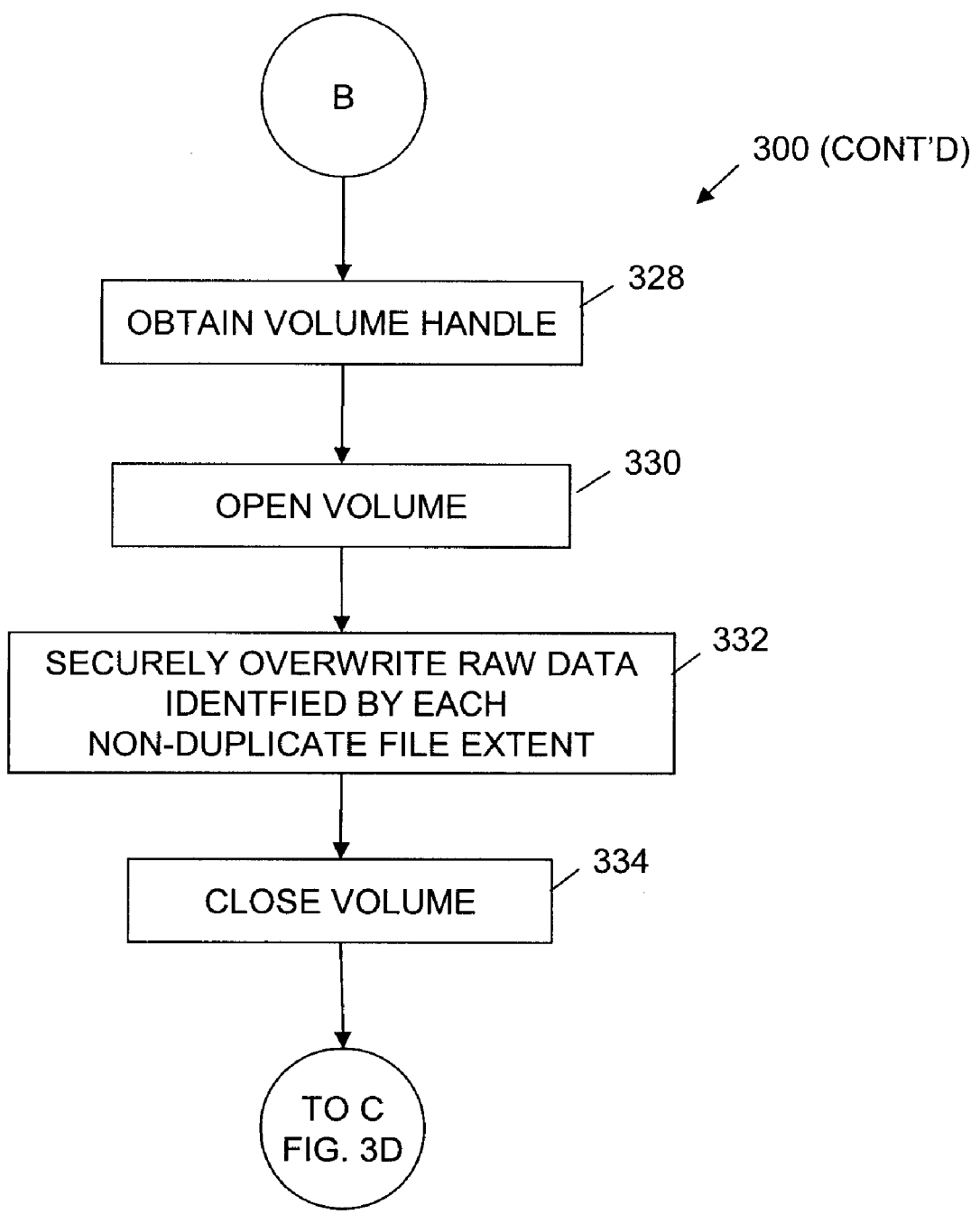

Referring now to FIGS. 1 and 3C together, in one embodiment, each volume snapshot has been evaluated to determine whether a file snapshot of the file identified for snapshot-aware secure deletion is present, and each non-duplicate file extent of the file snapshots of the file has been identified and entered in a non-duplicate file extent list. In operations 328 through 334, each of the non-duplicate file extents are accessed and securely overwritten as further described herein.

More particularly, in OBTAIN VOLUME HANDLE operation 328, the volume handle for the volume identified in operation 308 is obtained. In one embodiment, the volume handle is obtained from operating system 104. For example, in one embodiment, a call is made to the operating system to receive a handle to the volume identified by the volume ID obtained in operation 308. The operating system returns a handle to the volume, herein also termed the volume handle. Obtaining a volume handle for a specified volume is well known to those of skill in the art and is not further described herein to avoid detracting from the principles of the invention. From OBTAIN VOLUME HANDLE operation 328, processing transitions to an OPEN VOLUME operation 330.

In OPEN VOLUME operation 330, the volume is opened using the volume handle obtained in operation 328. More particularly, the volume of the physical disk, e.g., disk 114, is opened. Opening a volume using a volume handle is well known to those of skill in the art and is not further described herein to avoid detracting from the principles of the invention. From OPEN VOLUME operation 330, processing transitions to a SECURELY OVERWRITE DATA IDENTIFIED BY EACH NON-DUPLICATE FILE EXTENT operation 332.

In SECURELY OVERWRITE DATA IDENTIFIED BY EACH NON-DUPLICATE FILE EXTENT operation 332, the raw data of each of the non-duplicate file extents identified in operation 320 are securely overwritten on the disk, e.g., disk 114, using a secure overwrite technique. More particularly, by securely overwriting the raw data of the non-duplicate file extents at the volume level, a copy-on-write is not triggered and additional file snapshots are not generated.

A variety of secure overwrite techniques can be used to overwrite the data. For example, the raw data can be securely overwritten in accordance with a government approved secure overwrite technique, or can be securely overwritten with a different secure overwrite technique. The secure overwrite technique can overwrite the data in each of the non-duplicate file extents one or more times, and can use one or more patterns depending on the secure overwrite technique utilized. A variety of secure overwrite techniques are well known to those of skill in the art and are not further described herein in detail to avoiding detracting from the principles of the invention. From SECURELY OVERWRITE DATA IDENTIFIED BY EACH NON-DUPLICATE FILE EXTENT operation 332, processing transitions to a CLOSE VOLUME operation 334.

In CLOSE VOLUME operation 334, the volume opened in operation 330 is closed. Closing a volume is well known to those of skill in the art and is not further described herein to avoid detracting from the principles of the invention. From CLOSE VOLUME operation 334, processing transitions to an OPEN VOLUME SNAPSHOT operation 336.

Figure 3D:
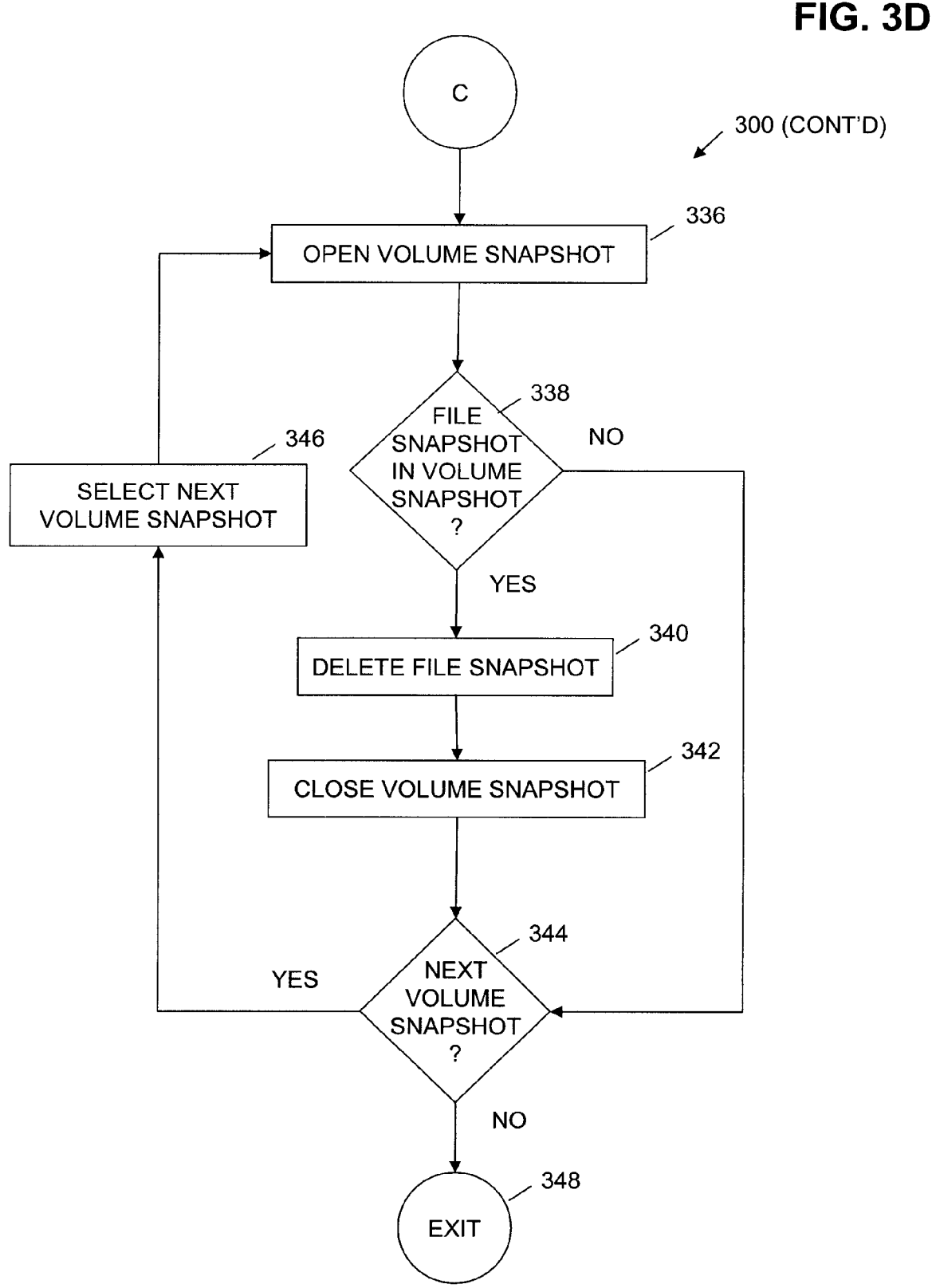

Referring now to FIGS. 1 and 3D together, in one embodiment, in operations 336 through 346, each of the volume snapshots identified in operation 310 are opened to determine whether a file snapshot of the file identified for snapshot-aware secure deletion is present. If a file snapshot is present in the volume snapshot, the file snapshot is deleted.

More particularly, in OPEN VOLUME SNAPSHOT operation 336, a volume snapshot identified in operation 310 is opened, for example, using the volume handle obtained in operation 328. From OPEN VOLUME SNAPSHOT operation 336, processing transitions to a FILE SNAPSHOT IN VOLUME SNAPSHOT check operation 338.

In FILE SNAPSHOT IN VOLUME SNAPSHOT check operation 338, a determination is made whether a file snapshot of the file identified for snapshot-aware secure deletion is present in the volume snapshot opened in operation 336. For example, in one embodiment, the volume snapshot is examined for the presence of the file path, file name, or other identifier associated with the file identified for snapshot-aware secure deletion.

In one embodiment, when a file snapshot of the file identified for snapshot-aware secure deletion is not present in the volume snapshot ("NO"), from FILE SNAPSHOT IN VOLUME SNAPSHOT check operation 338, processing transitions to a NEXT VOLUME SNAPSHOT check operation 344, further described herein. Alternatively, in one embodiment, when a file snapshot of the file identified for snapshot-aware secure deletion is present in the volume snapshot ("YES"), processing transitions from FILE SNAPSHOT IN VOLUME SNAPSHOT check operation 338, to a DELETE FILE SNAPSHOT operation 340.

In DELETE FILE SNAPSHOT operation 340, the file snapshot located in operation 338 is deleted. For example, in one embodiment, the file snapshot is deleted using DeleteFile( ) and identifying the file snapshot for deletion. The deletion is performed by the operating system, e.g., operating system 104, and thus the actual mechanism of deletion is dependent on the operating system. As earlier described, in a copy-on-write system which uses snapshots, when a file is deleted the associated MFT record will be tagged as deleted, and the old version of the file will be copied into the diff area, however, as all the raw data was overwritten in operation 332, the data copied into the diff area identifies overwritten data.

Deleting a file in a volume is well known to those of skill in the art and is not further described herein to avoid detracting from the principles of the invention. From DELETE FILE SNAPSHOT operation 340, processing transitions to a CLOSE VOLUME SNAPSHOT operation 342.

In CLOSE VOLUME SNAPSHOT operation 342, the volume snapshot opened in operation 336 is closed. For example, in one embodiment, the volume snapshot is closed using CloseVolume( ) and identifying the volume to be closed. Closure of a volume is well known to those of skill in the art and is not further described herein to avoid detracting from the principles of the invention. From CLOSE VOLUME SNAPSHOT operation 342, processing transitions to a NEXT VOLUME SNAPSHOT check operation 344.

In NEXT VOLUME SNAPSHOT check operation 344, a determination is made whether a next volume snapshot is present for evaluation. More particularly, in one embodiment, a determination is made whether a next volume snapshot in the volume snapshots list is present for evaluation. In one embodiment, when a next volume snapshot is present for evaluation ("YES"), processing transitions from NEXT VOLUME SNAPSHOT check operation 344 to a SELECT NEXT VOLUME SNAPSHOT operation 346.

In SELECT NEXT VOLUME SNAPSHOT operation 346, a next volume snapshot identified in operation 310 is selected for evaluation. For example, in one embodiment, the next volume in the volume snapshot list is selected. From SELECT NEXT VOLUME SNAPSHOT operation 346, processing transitions to operation 336 with the next volume snapshot selected in operation 346 being opened as earlier described.

Referring again to NEXT VOLUME SNAPSHOT check operation 344, alternatively, when a next volume snapshot is not present for evaluation ("NO"), each volume snapshot identified in operation 310 has been evaluated and each file snapshot associated with the file identified for snapshot-aware secure deletion has been deleted. From NEXT VOLUME SNAPSHOT check operation 344, processing transitions from NEXT VOLUME SNAPSHOT check operation 344 to an EXIT operation 348, with processing exiting method 300, or optionally returning to operation 304 on receipt of a next snapshot-aware secure delete event.

Figure 4:
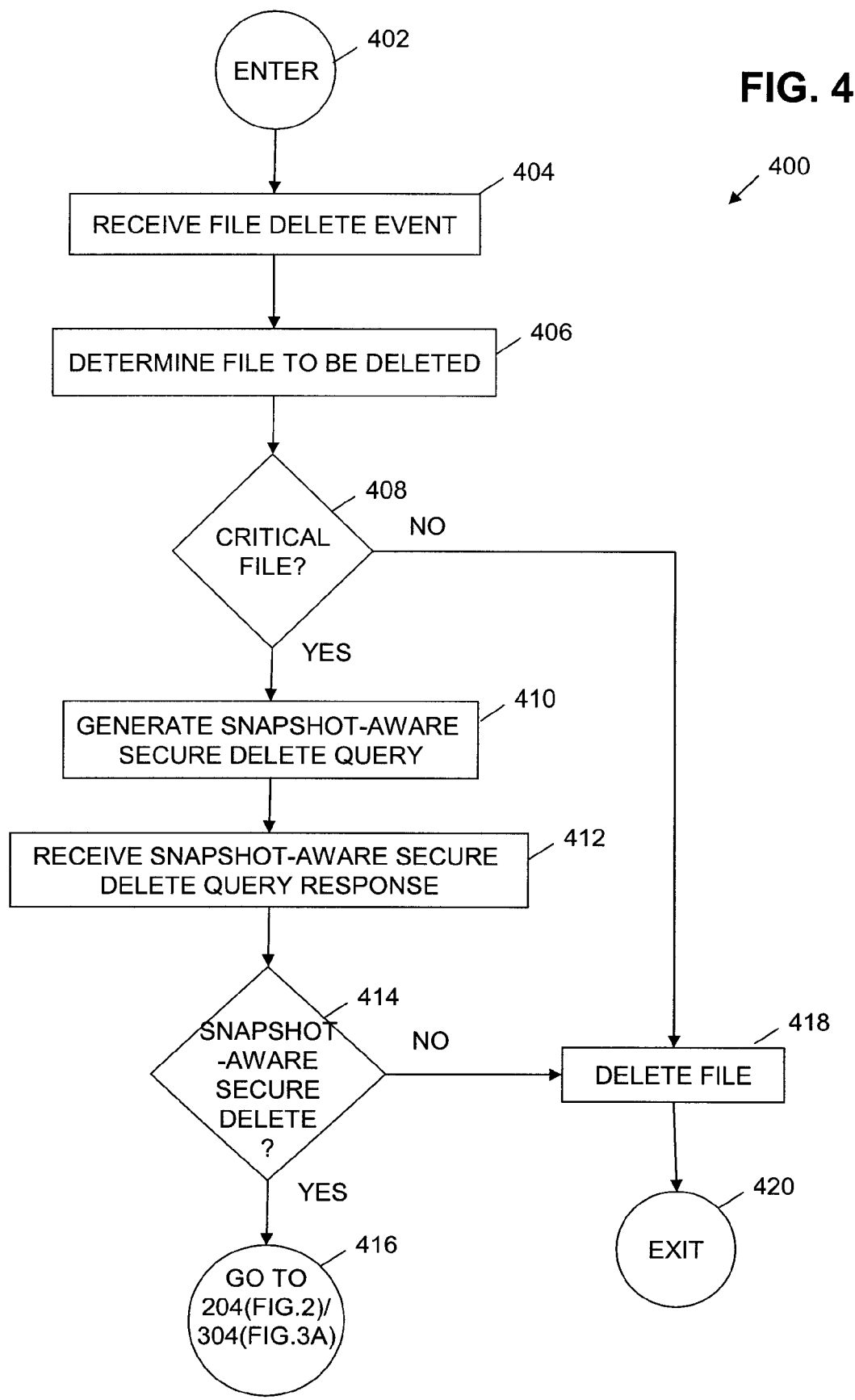
FIG. 4. illustrates a flow diagram of a method for initiating a snapshot-aware secure deletion of a file from a computer system based on a user response to a snapshot-aware secure delete query in accordance with one embodiment of the invention.

FIG. 4. illustrates a flow diagram of a method 400 for initiating a snapshot-aware secure deletion of a file from a computer system based on a user response to a snapshot-aware secure delete query in accordance with one embodiment of the invention. Referring now to FIGS. 1 and 4 together, in one embodiment, execution of snapshot-aware secure delete application 106 by processor 108 results in the operations of method 400 as described below. In one embodiment, method 400 is entered at an ENTER operation 402, and from ENTER operation 402, processing transitions to a RECEIVE FILE DELETE EVENT operation 404.

In RECEIVE FILE DELETE EVENT operation 404 a file delete event is received. Examples of a file delete events include, but are not limited to, a command, an application program interface (API), or other event that initiates or otherwise indicates the initiation of a file delete. In one embodiment, the file delete event identifies a file for deletion in accordance a conventional, non-snapshot-aware secure deletion technique. In one embodiment, the file for deletion is identified by a file name, file path, or other identifier. From RECEIVE FILE DELETE EVENT operation 404, processing transitions to a DETERMINE FILE TO BE DELETED operation 406.

In DETERMINE FILE TO BE DELETED operation 406, a file identified for deletion is determined. In one embodiment, the file to be deleted is determined from the file delete event. For example in one embodiment, the file is identified by a file name, file path, or other identifier. From DETERMINE FILE TO BE DELETED operation 406, processing transitions to a CRITICAL FILE check operation 408.

In CRITICAL FILE check operation 408, in one embodiment, a determination is made whether the file identified in operation 406 is a critical file. In one embodiment, a critical file is any file that should be considered for snapshot-aware secure deletion in accordance with an embodiment of the present invention. For example, in one embodiment, a critical file is a file that includes data that is confidential, privileged, security rated, or private.

In some embodiments, the file is scanned for the presence of indicators, such as words, flags, or other indicators, that correspond to one or more entries in a critical file indicator list, or a security policy. In one embodiment, when a file identified for deletion is not determined to be a critical file ("NO"), from CRITICAL FILE check operation 408, processing transitions to a DELETE FILE operation 418.

In DELETE FILE operation 418, the file identified in operation 406 is deleted. More particularly, the file is not deleted in accordance with a snapshot-aware secure deletion embodiment described herein. From DELETE FILE operation 418, processing transitions to an EXIT operation 420, with processing exiting method 400, or optionally returns to operation 404 on receipt of a next file delete event.

Referring again to CRITICAL FILE check operation 408, alternatively, in one embodiment, when a file identified for deletion is determined to be a critical file ("YES"), from CRITICAL FILE check operation 408, processing transitions to a GENERATE SNAPSHOT-AWARE SECURE DELETE QUERY operation 410.

In GENERATE SNAPSHOT-AWARE SECURE DELETE QUERY operation 410, a snapshot-aware secure delete query is generated and sent, for example to the sender of the file delete event, requesting input as to whether a snapshot-aware secure delete is desired. In some embodiments, the query further identifies the file as a critical file. In some embodiments, the query includes further information to assist in providing a response input. In some embodiments, a graphical user interface (GUI) is provided permitting the recipient to input a whether or not to initiate a snapshot-aware secure deletion. In some embodiments, the query may be presented as a pop-up or other device. From GENERATE SNAPSHOT-AWARE SECURE DELETE QUERY operation 410, processing transitions to a RECEIVE SNAPSHOT-AWARE SECURE DELETE QUERY RESPONSE operation 412.

In RECEIVE SNAPSHOT-AWARE SECURE DELETE QUERY RESPONSE operation 412, a response to the query of operation 410 is received. In one embodiment, the response indicates whether or not a snapshot-aware secure delete is to be initiated. From RECEIVE SNAPSHOT-AWARE SECURE DELETE QUERY RESPONSE operation 412, processing transitions to a SNAPSHOT-AWARE SECURE DELETE check operation 414.

In SNAPSHOT-AWARE SECURE DELETE check operation 414, a determination is made whether or not a snapshot-aware secure deletion is to be initiated. In one embodiment, the determination is made based on information provided in the response received in operation 412.

In one embodiment, when a snapshot-aware secure deletion is not indicated ("NO"), from SNAPSHOT-AWARE SECURE DELETE check operation 414, processing transitions to DELETE FILE operation 418 earlier described. Alternatively, in one embodiment, when a snapshot-aware secure deletion is indicated ("YES"), from SNAPSHOT-AWARE SECURE DELETE check operation 414, processing transitions, at operation 416, to a snapshot-aware secure delete method, such as method 200 at operation 204, or method 300 at operation 304.

Figure 5:
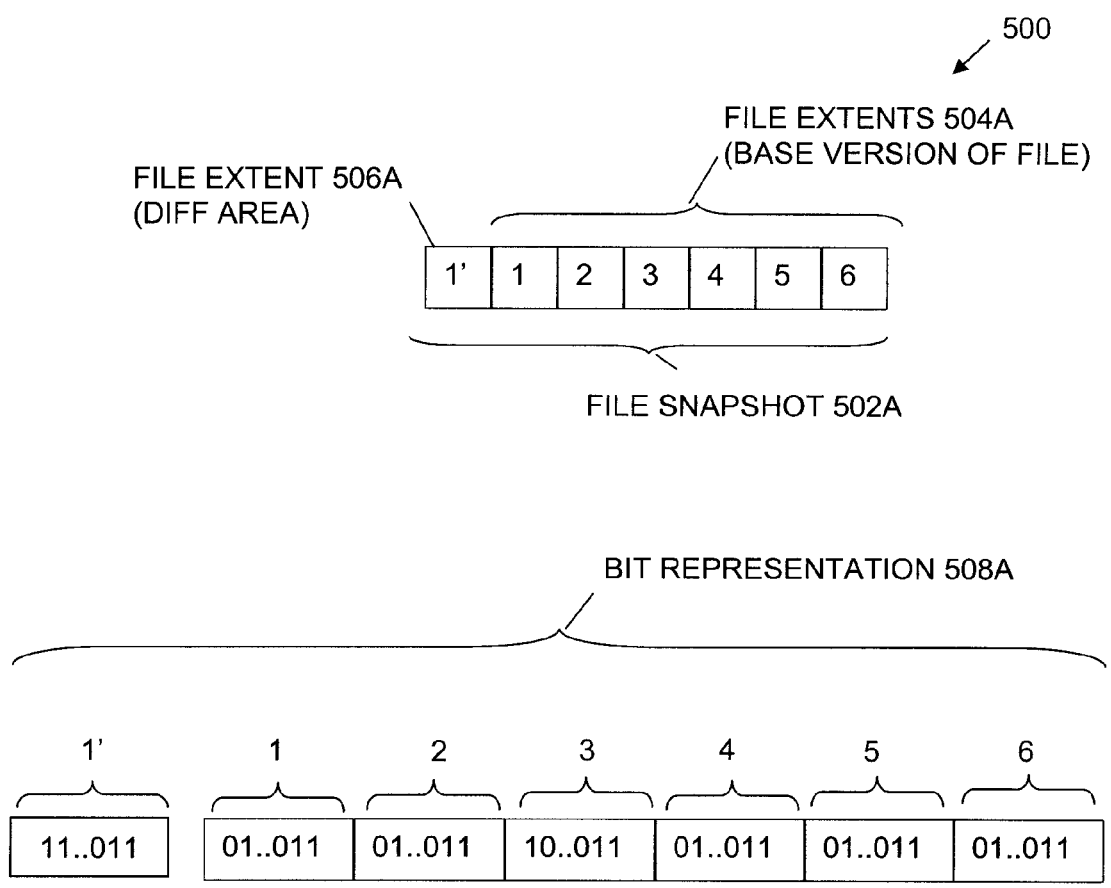
FIG. 5 is a diagram illustrating an initial state of a file snapshot prior to secure overwrite of the data of each non-duplicate file extent in accordance with one embodiment of the invention.

FIG. 5 is a diagram illustrating an initial state 500 of a file snapshot 502A prior to secure overwrite of the raw data of each non-duplicate file extent in accordance with one embodiment of the invention. In FIG. 5, file snapshot 502A includes: file extents 504A, herein separately identified as 1, 2, 3, 4, 5, and 6, which identify the locations of raw data that represent the base version of the file; and file extent 506A, identified as 1', which identifies the location of raw data that represents the changes made to the base version of the file stored in a diff area, e.g., changes to data cluster 1. Bit representation 508A illustrates the raw data, shown as ones (1's) and zeros (0's) as referenced to a respective file extent 1', 1, 2, 3, 4, 5, and 6.

FIG. 6 is a diagram illustrating a subsequent state of the file snapshot of FIG. 5 following secure overwrite of the data of each non-duplicate file extent in accordance with one embodiment of the invention. In FIG. 6, file snapshot 502B includes: file extents 504B, herein separately identified 1, 2, 3, 4, 5, and 6, which identify the locations of raw data that represent the base version of the file, now securely overwritten, for example, in operation 332, FIG. 3; and file extent 506B, identified as 1', which identifies the location of the raw data that represents the changes made to the base version of the file stored in the diff area, again, now securely overwritten, for example, in operation 332, FIG. 3. Bit representation 508B illustrates the securely overwritten raw data, shown as ones (1's) as referenced to a respective file extent 1', 1, 2, 3, 4, 5, and 6.

Following secure overwrite of the raw data at the volume level, for example, in operation 212 (FIG. 2) or operation 332 (FIG. 3), the base version data of the file and any associated diff area data no longer contain the original data. Thus, the file snapshots, no longer present the opportunity for comprise of the original data of the file on the computer system.

A less efficient alternative to the above embodiments, in another embodiment, iteratively, each of the file snapshots associated with the file identified for snapshot-aware secure deletion are accessed. The raw data of each file extent, redundant and non-redundant file extents, is overwritten, and the file snapshot is deleted. When the file is deleted a large amount of data is copied to the diff area of each file snapshot, because the entire file snapshot was overwritten. With large files, this alternative embodiment can consume a large amount of disk space.

Although snapshot-aware secure delete application 106 is referred to as a software application, this is illustrative only. The various embodiments of snapshot-aware secure delete application 106, e.g., method 200, method 300, and method 400, can also be implemented in hardware. In particular, hardware implementations, such as on hardware arrays, can be similarly implemented, with appropriate changes made to accommodate hardware systems. For example, array APIs may be used to manipulate and/or locate diff areas, and/or locate and access file snapshots.

Secure delete application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

Embodiments may be carried out using any suitable hardware configuration or means involving a personal computer, a workstation, a portable device, or a network of computer devices. Network configurations including client-server configurations and network configurations other than client-server configurations, e.g., peer-to-peer, web-based, intranet, Internet network configurations, can be used in other embodiments.

Herein, a computer program product comprises a tangible medium configured to store computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code. In another embodiment, a computer program product comprises a tangible medium configured to store computer readable code including CD-ROM discs, DVDs, ROM cards, floppy discs, magnetic tapes, computer hard drives and servers on a network.

As illustrated in FIG. 1, this medium may belong to the computer system itself. However, the medium also may be removed from the computer system. For example, snapshot-aware secure delete application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that can execute the functionality of snapshot-aware secure delete application 106 in accordance with at least one of the embodiments as described herein. Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionality of snapshot-aware secure delete application 106 can be implemented in a wide variety of computer system configurations. In addition, the functionality of snapshot-aware secure delete application 106 could be stored as different modules in memories of different devices.

For example, snapshot-aware secure delete application 106 could initially be stored in server computer system 130, and then as necessary, a portion of snapshot-aware secure delete application 106 could be transferred to host computer system 102 and executed on host computer system 102. Consequently, part of the functionality of snapshot-aware secure delete application 106 would be executed on processor 134 of server computer system 130, and another part would be executed on processor 108 of host computer system 102. In view of this disclosure, those of skill in the art can implement the various embodiments described herein in a wide-variety of physical hardware configurations using an operating system and computer programming language of interest to the user.

In yet another embodiment, snapshot-aware secure delete application 106 is stored in memory 136 of server computer system 130. Snapshot-aware secure delete application 106 is transferred over network 126 to memory 112 in host computer system 102. In this embodiment, network interface 138 and I/O interface 110 would include analog modems, digital modems, or a network interface card. If modems are used, network 126 includes a communications network, and snapshot-aware secure delete application 106 is downloaded via the communications network.

This disclosure provides exemplary embodiments. The scope of the various embodiments described herein is not limited by these exemplary embodiments. Numerous variations, whether explicitly provided for by the specification or implied by the specification or not, may be implemented by one of skill in the art in view of this disclosure.

What is claimed is:

1. A computer implemented method comprising:
   executing, on a processor, a snapshot-aware secure delete application, wherein said executing comprises:
      accessing each file snapshot associated with a file on a computer system, wherein said each file snapshot includes one or more file extents identifying raw data associated with said each file snapshot;
      identifying each non-duplicate file extent of said one or more file extents to obtain the non-duplicate file extents for a base version of the file and the non-duplicate file extents representing changes to the base version of the file;
      securely overwriting said raw data identified by said each non-duplicate file extent,
         wherein said securely overwriting said raw data identified by each said non-duplicate file extent comprises:
            securely overwriting raw data representing the base version of said file; and
            securely overwriting raw data representing the changes to said base version of the file; and
      deleting said each file snapshot associated with said file on said computer system.

2. The computer implemented method of claim 1, further comprising:
   receiving a snapshot-aware secure delete event, said snapshot-aware secure delete event identifying said file for snapshot-aware secure deletion on said computer system; and
   determining said file identified for snapshot-aware secure deletion.

3. The computer implemented method of claim 1, wherein said securely overwriting said raw data is performed at a volume level of a file system utilized by said computer system.

4. The computer implemented method of claim 1, wherein said each file snapshot associated with said file is accessed at a volume level of a file system utilized by said computer system.

5. The computer implemented method of claim 1, further comprising:
   receiving a file delete event, said file delete even identifying said file for deletion on said computer system;
   determining said file identified for deletion;
   determining whether said file is a critical file;
   wherein when said file is determined to be said critical file, said method further comprising:
      generating a snapshot-aware secure delete query;
      receiving a snapshot-aware secure delete query response;
      determining whether said snapshot-aware secure delete query response indicates snapshot-aware secure deletion of said file;
      wherein when said snapshot-aware secure delete query response indicates snapshot-aware secure deletion of said file, initiating said snapshot-aware secure deletion of said file; and,
      wherein when said snapshot-aware secure delete query response does not indicate snapshot-aware secure deletion of said file, deleting said file on said computer system in a manner that is not said snapshot-aware secure deletion; and
   wherein when said file is determined not to be said critical file, said method further comprising:
      deleting said file on said computer system in said manner that is not said snapshot-aware secure deletion.

6. The computer implemented method of claim 1, wherein said method is implemented in hardware in place of executing said application on said processor.

7. A computer implemented method comprising:
   executing, on a processor, a snapshot-aware secure delete application, wherein said executing comprises:
      receiving a snapshot-aware secure delete event, said snapshot-aware secure delete event identifying a file for snapshot-aware secure deletion on a computer system;
      determining said file identified for snapshot-aware secure deletion;
      determining a volume in a file system utilized by said computer system, said volume storing raw data associated with said file;
      identifying each volume snapshot stored on said volume;
      accessing said each volume snapshot stored on said volume;

determining each file snapshot associated with said file present in said each volume snapshot;

identifying each non-duplicate file extent identified in said each file snapshot to obtain the non-duplicate file extents for a base version of the file and the non-duplicate file extents representing changes to the base version of the file, said each non-duplicate file extent identifying the location of raw data on said computer system;

obtaining a volume handle to said volume;

opening said volume utilizing said volume handle;

securely overwriting raw data identified by said non-duplicate file extents for a base version of the file; and securely overwriting raw data identified by said non-duplicate file extents representing the changes to said base version of the file;

closing said volume;

opening each said volume snapshot;

determining whether a file snapshot associated with said file is present in each said volume snapshot;

wherein when a file snapshot associated with said file is present in a volume snapshot, deleting said file snapshot on said computer system; and closing each said volume snapshot.

8. The computer implemented method of claim 7, wherein said method is implemented in hardware in place of executing said application on said processor.

9. A computer-program product comprising a tangible computer readable medium containing computer program code for a snapshot-aware secure delete method comprising:

accessing each file snapshot associated with a file on a computer system, wherein said each file snapshot includes one or more file extents identifying raw data associated with said each file snapshot;

identifying each non-duplicate file extent of said one or more file extents to obtain the non-duplicate file extents for a base version of the file and the non-duplicate file extents representing changes to the base version of the file;

securely overwriting said raw data identified by said each non-duplicate file extent, wherein said securely overwriting said raw data identified by each said non-duplicate file extent comprises:

securely overwriting raw data representing the base version of said file; and securely overwriting raw data representing the changes to said base version of the file; and deleting said each file snapshot associated with said file on said computer system.

10. A computer program product comprising tangible computer readable medium containing computer program code for a snapshot-aware secure delete method comprising:

receiving a snapshot-aware secure delete event, said snapshot-aware secure delete event identifying a file for snapshot-aware secure deletion on a computer system;

determining said file identified for snapshot-aware secure deletion;

determining a volume in a file system utilized by said computer system, said volume storing raw data associated with said file;

identifying each volume snapshot stored on said volume;

accessing said each volume snapshot stored on said volume;

determining each file snapshot associated with said file present in said each volume snapshot;

identifying each non-duplicate file extent identified in said each file snapshot to obtain the non-duplicate file extents for a base version of the file and the non-duplicate file extents representing changes to the base version of the file, said each non-duplicate file extent identifying the location of raw data on said computer system;

obtaining a volume handle to said volume;

opening said volume utilizing said volume handle;

securely overwriting raw data identified by said non-duplicate file extents for a base version of the file; and securely overwriting raw data identified by said non-duplicate file extents representing the changes to said base version of the file;

closing said volume;

opening each said volume snapshot;

determining whether a file snapshot associated with said file is present in each said volume snapshot;

wherein when a file snapshot associated with said file is present in a volume snapshot, deleting said file snapshot on said computer system; and closing each said volume snapshot.

11. A computer system comprising:

a memory having stored therein a snapshot-aware secure delete application; and a processor coupled to said memory, wherein execution of said snapshot-aware secure delete application generates a method comprising:

accessing each file snapshot associated with a file on a computer system, wherein said each file snapshot includes one or more file extents identifying raw data associated with said each file snapshot;

identifying each non-duplicate file extent of said one or more file extents to obtain the non-duplicate file extents for a base version of the file and the non-duplicate file extents representing changes to the base version of the file;

securely overwriting said raw data identified by said each non-duplicate file extent, wherein said securely overwriting said raw data identified by each said non-duplicate file extent comprises:

securely overwriting raw data representing the base version of said file; and securely overwriting raw data representing the changes to said base version of the file; and deleting said each file snapshot associated with said file on said computer system.

12. A computer system comprising:

a memory having stored therein a snapshot-aware secure delete application; and a processor coupled to said memory, wherein execution of said snapshot-aware secure delete application generates a method comprising:

receiving a snapshot-aware secure delete event, said snapshot-aware secure delete event identifying a file for snapshot-aware secure deletion on a computer system;

determining said file identified for snapshot-aware secure deletion;

determining a volume in a file system utilized by said computer system, said volume storing raw data associated with said file;

identifying each volume snapshot stored on said volume;

accessing said each volume snapshot stored on said volume;

determining each file snapshot associated with said file present in said each volume snapshot;

identifying each non-duplicate file extent identified in said each file snapshot to obtain the non-duplicate file extents for a base version of the file and the non-duplicate file extents representing changes to the base version of the file, said each non-duplicate file extent identifying the location of raw data on said computer system;
obtaining a volume handle to said volume;
opening said volume utilizing said volume handle;
securely overwriting raw data identified by said non-duplicate file extents for a base version of the file; and
securely overwriting raw data identified by said non-duplicate file extents representing the changes to said base version of the file;
closing said volume;
opening each said volume snapshot;
determining whether a file snapshot associated with said file is present in each said volume snapshot;
  wherein when a file snapshot associated with said file is present in a volume snapshot, deleting said file snapshot on said computer system; and
closing each said volume snapshot.

* * * * *

UNITED STATES PATENT AND TRADEMARK OFFICE
CERTIFICATE OF CORRECTION

| | | |
|---|---|---|
| PATENT NO. | : 7,831,560 B1 | Page 1 of 1 |
| APPLICATION NO. | : 11/615692 | |
| DATED | : November 9, 2010 | |
| INVENTOR(S) | : Michael Paul Spertus and Timothy Michael Naftel | |

It is certified that error appears in the above-identified patent and that said Letters Patent is hereby corrected as shown below:

Column 16, Line 23, Claim 5, replace "even" with --event--.

Signed and Sealed this
Eighth Day of February, 2011

David J. Kappos
*Director of the United States Patent and Trademark Office*